Figure 1:
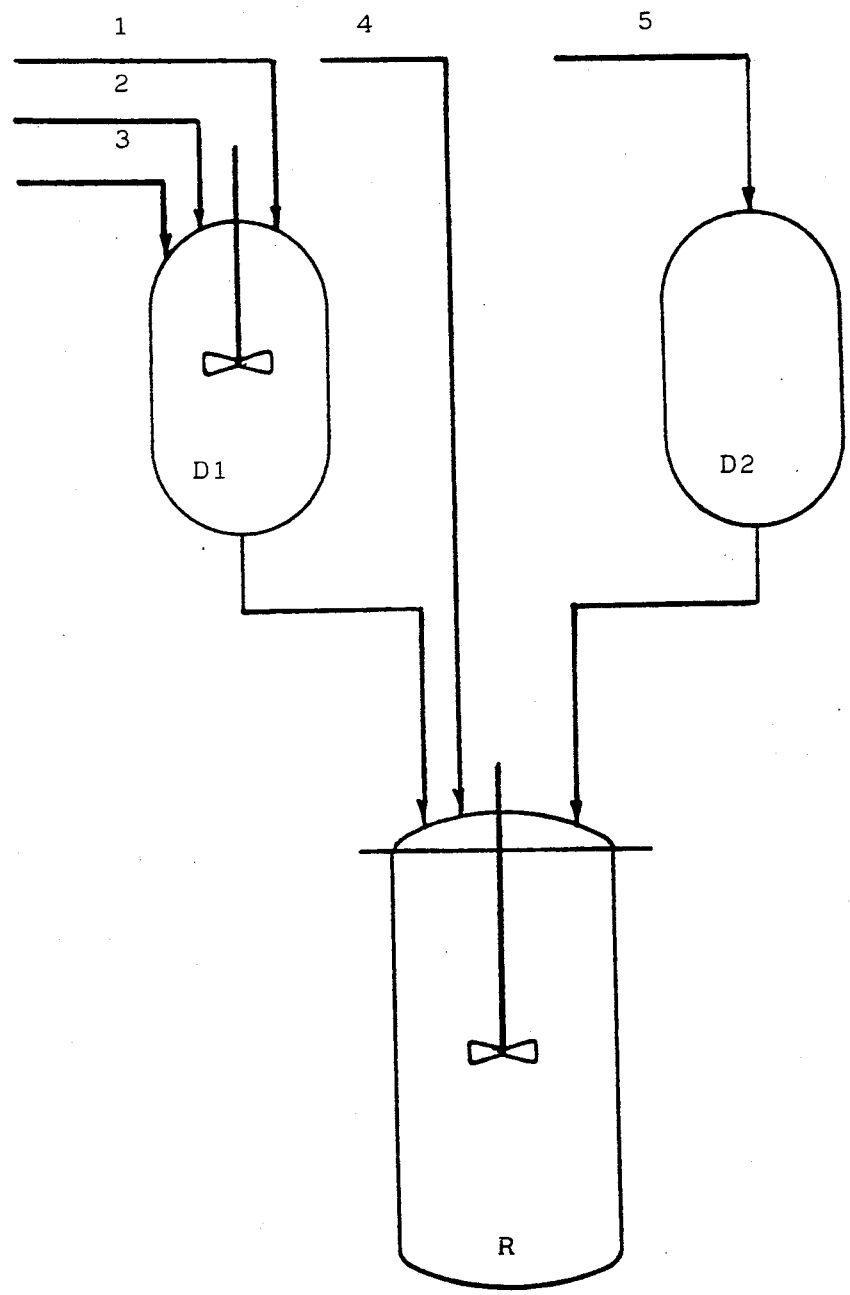

United States Patent
Colombo et al.

[11] Patent Number: 5,112,905
[45] Date of Patent: May 12, 1992

[54] TRANSESTERIFIED COPOLYMERS OF MALEIC ANHYDRIDE, PARTICULARLY USEFUL IN THE FIELD OF DETERGENCY

[75] Inventors: Paolo Colombo, Saronno; Claudio Troglia, Milan; Santina R. Verzellino, Limbiate; Giuseppe Muratori, Novara, all of Italy

[73] Assignee: Ausidet S.r.L., Milan, Italy

[21] Appl. No.: 504,019

[22] Filed: Apr. 4, 1990

[30] Foreign Application Priority Data

Apr. 5, 1989 [IT] Italy ................. 20015 A/89

[51] Int. Cl.$^5$ ............................................. C08F 8/14
[52] U.S. Cl. ........................... 525/60; 525/327.6; 525/327.7; 525/384
[58] Field of Search ................ 525/327.7, 60, 327.6

[56] References Cited

U.S. PATENT DOCUMENTS

| | | | |
|---|---|---|---|
| 2,306,071 | 1/1943 | McNally et al. | 525/327.7 |
| 2,324,739 | 7/1943 | Stoops et al. | 525/327.7 |
| 2,616,851 | 11/1952 | Giammaria | 525/327.7 |
| 2,861,056 | 11/1958 | Minsk | 525/327.7 |
| 2,876,894 | 3/1959 | Dahlquist et al. | 525/327.7 |
| 4,748,976 | 5/1988 | Young et al. | 525/60 |

Primary Examiner—Bernard Lipman
Attorney, Agent, or Firm—Morgan & Finnegan

[57] ABSTRACT

Transesterified copolymers of maleic anhydride, particularly useful in the field of detergency and anti-scaling agents, obtained from preformed copolymers of maleic anhydride with vinyl acetate, by at least partial transesterification of said preformed copolymers.

14 Claims, 1 Drawing Sheet

TRANSESTERIFIED COPOLYMERS OF MALEIC ANHYDRIDE, PARTICULARLY USEFUL IN THE FIELD OF DETERGENCY

BACKGROUND OF THE INVENTION

1. Field of the Invention

The invention relates to transesterified copolymers of maleic anhydride with vinyl acetate, particularly useful in the field of detergency and as anti-scaling agents.

2. The state of the art

The action of the sequestering agents in the presence of drinkable water, or of untreated industrial water, is well known. These agents, by formation of complexes with polyvalent metal ions (for instance alkaline-earth metal ions), which form the water hardness, and even with other heavy ions, hinder the formation of precipitates, thus avoiding the scale (incrustation) deposition. In plants where water is warmed, such as boilers or heat-exchangers, the above mentioned agents hinder, as is known, the scale formation on the metal surface. During home-washing and industrial cleaning, polyvalent metal ions may interact with the anions present in the soil and with the anions dissolved by the detergent. In this case also, the scaling (incrustation) action of the mentioned agents on the fabric fibers is known. When control agents are not present, the incrustation would increase the ash contents, washing by washing, thus causing undesired matting and grey coloration phenomena.

A compound used since many years (showing an excellent activity against the formation of precipitates and inhibiting the re-deposition of solid particles and soil on fabrics) is sodium tripolyphosphate. However, it is known that such compound, by degradation in water, gives rise to phosphates, which in turn favor the anomalous growth of algae in inland waters and seas. Thus contributes to the phenomenon known as eutrofication and to the consequent reduction (in the most serious cases exhaustion) of the oxygen contents in waters, with imaginable ecologic consequences. That is why, in many countries, laws were introduced to limit or to forbid the use of sodium tripolyphosphate in detergents. Other compounds having a fair complexing and anti-precipitation activity against soil (and insoluble salts) are aminocarboxylic acids. We mention for instance the sodium salts of nitrilotriacetic acid (NTA) and of ethylenediaminotetracetic acid (EDTA). However, these compounds show some drawbacks, limiting their use, such as the presence of nitrogen in the molecule nitrogen, in fact, has a role in the eutrofication process. Therefore, their use can be only a restricted use. The reduction of the Na-tripolyphosphate contents in detergents has become possible by the use of gradually increasing amounts of Zeolite 4A (a particular sodium aluminosilicate) with substitution ratios higher that 1:1, on sodium tripolyphosphate. In order to get a more effective and complete activity of the detergent formulations having low phosphorous contents, the contemporary presence of other agents, different from zeolite, and/or coadjuvants of detergency, showing a particular action, is also requested.

The Applicants have now found new and more effective chemical intermediates, which do not contain either phosphorus or nitrogen atoms in their structure and which are consisting only of C, H and O atoms, exhibiting a fair effectiveness, so that they can be used as sequestering agents, or generally as coadjuvants, and furthermore as anti-scaling agents in processes involving the heating of drinkable and industrial waters. Furthermore, the new intermediates can be used with a great advantage in detergency processes, where the presence of alkaline-earth ions, already in the cold, may give rise to the precipitation of insoluble salts, because of the interaction of some components of the detergent and as the result of heating processes, thus forming precipitates typical of the hard waters. These intermediates are particular derivatives of the maleic anhydride-vinyl acetate copolymers, hereinafter MA-VA copolymers, which show superior technological properties in comparison with the (hydrolized) copolymers used in the past and described for instance in U.K. Patent No. 1,385,131.

DISCLOSURE

In its broadest aspect the invention relates to transesterified copolymers of maleic anhydride, expecially useful in the field of detergency and anti-scaling agents, obtained from preformed copolymers of maleic anhydride with vinyl acetate (and optionally with other monomers containing a double bond) by an at least partial transesterification of said preformed copolymers, the transesterification degree being preferably from 10 to 80% and still better from 15 to 50%. In detail, it has been surprisingly found that the dispersing and antiprecipitating action of the copolymers of maleic anhydride with vinyl acetate reaches optimum values after a partial transesterification treatment, which makes available only few groups of free vinyl alcohol in the chain, while a share of unconverted vinyl acetate still remains present. This fact acts in such a manner as to allow the amount of copolymer, in a detergent or anti-scaling formulation, to be much lower than in the past.

The new copolymers show excellent technological properties when their average molecular weight is from 1,000 to 100.000 (preferably from 2.000 to 50.000), the polydispersity ratio being from 2 to 5. They can be obtained from the parent (preformed) copolymers by transesterification with an aliphatic or cycloaliphatic alcohol and preferably with a saturated aliphatic alcohol having from 1 to 4 C atoms, in particular methanol, ethanol, isopropanol, n-propanol and butanol.

The transesterification treatment must not be drastic, but mild, in order to convert a portion of the vinyl acetate units (present in the chain) into vinyl alcohol units, thus allowing the contemporary formation of the acetic ester of the used alcohol. By this way, a methyl, ethyl, isopropyl or butyl acetate is formed, which is then recovered together with the excess alcohol. An advantage coming from the invention resides in that the sodium acetate, formed when the base copolymer undergoes a drastic treatment (hydrolysis) with aqueous NaOH, is minimized or eliminated. Sodium acetate is an undesired by-product, because it remains included in the copolymer and its removal is never easy or complete.

The parent copolymer, which has to be transesterified, can be used in a dry form (for instance as a powder). The recovery of the copolymerization solvent (for instance toluene) which remains soaked on the parent copolymer, can be carried out before or at the end of the transesterification, which takes place also without any catalyst, because the acidic groups, formed by the opening of the maleic ring, already exhibit a satisfactory catalytic activity. Usually, during the transesterification, the copolymer dissolves in the (alcoholic) reaction liquid. The transesterification degree can be controlled by adjusting the excess of alcohol, the reaction temperature and the reaction time.

The new copolymers can be used in liquid formulations, requesting both the compatibility (miscibility) of the copolymers with the detergent liquid system and their noninterference with the enzymes, during the storage of the detergent. The desactivation of the enzyme, in aqueous liquid detergent formulations and in the presence of coadjuvants, is generally to be attributed to the removal from the system of calcium ions, which are one of the most effective stabilizers of the enzyme. By varying the transesterification degree, it is possible to work in such a manner as to obtain the desired products with a reduced pKCa, in order to maintain a restricted but not null value of free calcium ions, anyhow under such conditions as to avoid a precipitation (caused by other chemical agents present in the formulation). Moreover, the use of enzymes, protected by means of dispersion in hydrofuge oils, allows a synergism in limiting the decrease of the calcium ions present in the enzyme.

Obviously, the above mentioned formulations may contain anionic, non ionic, amphoteric or zwitterionic surfactants, soaps, builders, solubilizers, enzymes, perfumes, dyestuffs, protective agents and so on. Said copolymers can be used in the field of powder formulations, by addition of copolymer solutions to the suspensions fed to a spray drying plant. In this case no problem exists as to the interference with the enzymes (used in form of granules and therefore protected) because of the absence of the continuous liquid phase which favors the mass-transfer.

The powder detergent formulations we are referring to, usually consisting of many components, selected for instance from anionic surfactants (for instance LAS, alphasulfomethylesters, alkylsulfates, alkyl polyethoxysulfates); non-ionic surfactants (for instance ethoxylated alcohols, ethoxylated nonyl-phenols, sugar esters, alkylpolyglucosides etc.); soaps; builders (for instance zeolites, citric acid, NTA, sodium carbonate etc.); stabilizers (sodium silicate, EDTA-Na, magnesium silicate etc.); bleaching agents (e.g. sodium perborate mono- and/or tetrahydrate, percarbonate etc.); bleaching activators (PAG, TAED, TAGU, NOFSNA etc.); inhibitors of the grey coloration, such as carboxymethylcellulose (CMC); inorganic salts (for instance $Na_2SO_4$). Other generally used components are optical brighteners, perfumes, colored speckles etc. NOFSNA means nonanoyl-phenolsulfonate (sodium salt).

The amount of copolymer to be used in liquid and powder detergents is generally between 0.5 and 15%, preferably between 1 and 8% b.w. The amount of copolymer to be added to water to avoid scale (fouling) is generally from 0.1 to 1,000 ppm and preferably from 1 to 100 ppm.

The polymers to be transesterified, according to the invention, are copolymers of maleic anhydride with vinyl acetate, exactly alternated, or copolymers where, besides the two mentioned monomers (in equimolar amount) limited amounts of other mono-unsaturated monomers, such as for instance acrylic acid, methacrylic acid, acrylates (methyl, butyl, ethyl or hydroxyethyl acrylates), itaconic acid, methyl-vinyl ether and vinyl acetate itself, are added, in amounts from 0.05 to 1 mol per mol of maleic anhydride. The copolymers and terpolymers of the invention can be obtained by semicontinuous or continuous polymerization (or terpolymerization respectively), after having prepared an exactly equimolar adduct between maleic anhydride and vinyl acetate, by continuously feeding into the reaction system said adduct, the termonomer (if any) and the catalytic system.

The reaction medium to be used, for the copolymerization of terpolymerization, is generally an organic liquid having a low or intermediate polarity, which limits the interactions with the monomers and with the catalytic system. This liquid must be a solvent for maleic anhydride and/or for its adduct with vinyl acetate, but must be preferably a non-solvent for the successively formed copolymer. Usually aromatic solvents (such as benzene, toluene, ethylbenzene etc.); halogenated aromatic solvents (monochlorobenzene etc.); cycloaliphatic solvents (cyclohexane etc.); mixtures of aromatic and cycloaliphatic solvents; aliphatic chlorinated solvents (chloroform, dichloroethane, carbon tetrachloride, methylene chloride etc.) are used. Also low- boiling chlorinated solvents, such as methylchloride, could be used but, under the requested working conditions, it is necessary to work under pressure. Aliphatic ketones (acetone, methyl-ethyl ketone etc.) can be used, but some copolymers may result in the form of solution of in the form of a strongly swelled suspension. The polymerization temperature is between room temperature and 150° C. (preferably between 50° and 120° C.), to avoid working under pressure and to have kinetics suitable for industrial purposes. The transesterification temperature is generally from 50° to 150° C., preferably from 65° to 120° C.

Radical initiators for these co- and ter-polymerizations are the generally used initiators of radical (solution) polymerizations, such as azoderivatives (in particular azobis-isobutyronitrile); acyl peroxides (such as benzoyl peroxide or lauroyl peroxide and so on); peresters; dialkylperoxides; peroxycarbonates (percarbonates); hydroxyperoxides and mixtures thereof. The choice of the initiator is also depending on the reaction temperature, which is in turn controls the optimum value of the semitransformation time (time necessary for decomposing 50% of the initiator). Other details as to said initiators are reported in European Patent 103,254, the contents of which is integrant part of the present description.

During the copolymerization, a solid is formed, which remains suspended in the reaction solvent, from which it is separated (at the end of the reaction). The separation can be carried out by means of filtration or centrifugation and the solid product is then dried, expecially if it is directly used in detergent formulations.

The copolymerization of maleic anhydride with vinyl acetate is known since many years. See for example the work of WILDE and SMETS, on the Journal of Polymer Science [vol. V, No. 2 (1949)], concerning the determination of the values $r_1$ and $r_2$ (reactivity ratios) in the copolymerization of maleic anhydride with different monomers (among which vinyl acetate). More recently [see J. Macromol. Sci.-Chem. A 9(1) pp.29-43 (1975)]. Caze and Loucheux have carried out a research on the alternating radical copolymerization of a charge transfer complex (adduct), which furtherly reacts during the polymerization. The same authors, Caze and Loucheux, still more recently [M. Macromol. Sci.-Chem.A 15(1), pp. 95-105 (1981)] have carried out another research on the microstructure of these copolymers, showing the alternation between the two comonomers, independently of the feed composition. The alternate and regular structure of the comonomers is very important, in order to obtain good dispersing and complexing properties.

The examples which follow are supplied merely for illustration purposes, without limiting in any way the scope of the invention. As to the methods used for the determination of the parameters mentioned in the examples, we go further into details as follows:

calcium binding capacity: HAMPSHIRE TEST, mentioned in German Patent No. 1,904,941, corresponding to UK Patent No. 1,296,413;

dispersing capacity: BASF METHOD described in a paper by F. RICHTER and E. W. WINKLER on TENSIDE, SURFACTANTS AND DETERGENTS, 24(4); page 213 (1987);

"threshold inhibition" or "crystal modification"; see the paper by G. Mc Grew published on CHIMICA OGGI (1986); No. 10, page 57);

complexing capacity; the determination of the chelating properties was carried out using a calcium ion ($Ca^{++}$) selective electrode, as described in ANALYTICAL LETTERS vol. 4 (10); pp. 653-663 (1971);

transesterification level; the $^1H$-NMR spectrometric method (protonic in deuterated $H_2O$; determination of percentage of vinyl alcohol units) was used.

EXAMPLE 1

The test of this example was carried out in a 2 liter glass reactor, provided with stirrer, thermometer, reflux condenser and thermostating jacket. The solutions of the monomers were separately prepared (49 g of maleic anhydride and 43 g of vinyl acetate in 320 $cm^3$ of toluene. Separately an initiator solution (azobis-isobutyronitrile) in toluene was prepared and this solution was added to the monomers in such an amount that, at the end, 1% of the initiator calculated on the overall monomers, was used. 30% of the solutions of monomers and of the initiator were transferred into the reactor and the temperature was raised up to 90° C.; the continuous feed began immediately. Since the beginning, the polymer separated in the form of small (suspended) solid particles. After 1 h, having completed the addition of both catalyst and monomers, the reactor was heated at 110C, under vigorous stirring, for one further hour, in order to minimize the content of free monomer. After cooling, the suspension of the solid in the solvent (about 18.5% b.w.) was discharged. The content of free monomer was corresponding to a 98.6% conversion. The suspension was cold filtered, and the cake was washed with petroleum ether and then dried.

By this way, 90.7 g of solid were recovered, and the molecular weight measurement (GPC) (gel permeation chromatography) was determined, as well as the necessary finishing, in order to make the solid suitable for detergency and for water treatment. The weight average molecular weight (Mw) was 38.000 and the number average molecular weight (Mn) was 11,600.

EXAMPLE 2

Example 1 was repeated, replacing the solvent (toluene) by ethylbenzene and using, as the radical initiator, benzoyl peroxide (in an amount corresponding to 2.25% b.w. on the overall monomers). A portion, corresponding to 30% of the monomers and of the initiator, was fed into the reactor at the beginning of the operation, the remaining portion was fed continuously during 1.5 h, while keeping the temperature constant at 90° C. After having stirred for one further hour (always at 90° C.), the resulting suspension was cooled, discharged and filtered off. The collected solid (89.9 g) was washed with petroleum ether and dried. The characterization (GPC) showed that Mw was 11,575 and Mn was 3,650.

EXAMPLE 3

Example 1 was repeated, continuously feeding into the reactor also 10.2 g of acrylic acid (11% b.w., on the maleic anhydride and vinyl acetate adduct), previously diluted with a small amount (30 g) of toluene. After continuous feeding for 2 hours and one further hour under reflux, in order to complete the reaction, cooling, filtration, washing and drying were carried out 97.8 g of a powder copolymer (Mw=48 000; Mn=12 800) were obtained.

EXAMPLE 4

Following FIG. 1, 49 g of maleic anhydride (1) and 43 g of vinyl acetate (2) were admixed with 300 $cm^3$ of toluene (3) in the mixer tank D1. By this way, a charge transfer complex, confirmed by the $^1H$-NMR spettroscopy, was obtained, wherein both maleic and vinyl units were present in equimolar amounts. A second tank (D2) was fed with a solution (5) consisting of 43 g of pure vinyl acetate (without maleic anhydride), in 80 g of toluene. The content of the tank (D1) was then fed continuously to a reactor (R), kept at the constant temperature of 110° C., contemporaneously with 21.4 g of a 6.3% b.w. solution (4) of azobis-isobutyronitrile in toluene and with the solution coming from tank (D2), by carefully keeping the ratios at a constant level. After 1 h, the continuous feeding of the reactants was completed; the reactor was kept, under vigorous stirring, at 110° C. for one further hour. Thereafter, the copolymer suspension was cooled and discharged. After filtration, washing and drying, 133.8 g of copolymer (Mw=59,400; Mn=13,500) were obtained; the copolymer showed a rather regular structure (according to $^1H$-NMR analysis), showing one mole of maleic anhydride alternated with 2 mols of vinyl acetate.

EXAMPLE 5

The test of this example was carried out in a plant including a pre-mixer for maleic anhydride and vinyl acetate (in the presence of toluene), metering pumps, a container for the catalyst solution and a stirred reactor (provided with jacket and automatic outlet). 824 g/h of a solution containing 11.9% b.w. of maleic anhydride and 10.5% of vinyl acetate, as well as a solution of azobisisobutyronitrile (in toluene) were continuously fed, so that the feed amount was corresponding to 1% b.w. on the overall monomers. At the beginning, the reactor was heated at 110° C., by means of a thermal fluid flowing in the jacket. Thereafter, the polymerization heat was removed by reflux condensation of toluene. The residence time, calculated on the overall monomers, was about 5 hours. The suspension of the copolymer was continuously discharged. Thereafter it was filtered off and the solid was washed and dried. A powder copolymer was obtained, having Mw=35,200 and Mn=10,400. A portion of this copolymer was transesterified with methanol {according to example 10).

EXAMPLE 6

30 g of copolymer, prepared according to example 1, and 100 g of anhydrous methanol were introduced into a reactor equipped with stirrer, thermometer and reflux condenser. The whole was heated at the boiling point (approximately 68° C.) and the reflux was maintained for 2 hours. Thereafter, 100 cm$^3$ of distilled water were added, while heating under reflux conditions for one further hour. The excess of methyl alcohol was then distilled off. After cooling, the mixture was neutralized with aqueous NaOH (48% b.w.). The final product, diluted to 1% concentration, had a pH = 8.14. Data and results are reported in Table I.

EXAMPLES 7, 8, 9 AND 10

Following the pathway of the preceding example, the copolymers (powdery) obtained according to examples 2, 3, 4 and 5 were subjected to a transesterification reaction with methyl alcohol, thus obtaining aqueous solutions of partially transesterified copolymers, which were characterized along with the non-transesterified copolymers. More particularly, the copolymers obtained according to examples 1, 2, 3, 4 and 5, dissolved into an alkaline solution, and the corresponding copolymers treated according to the transesterification reaction, were characterized. The complexing capacity, calcium binding capacity, threshold inhibition and dispersing capacity were determined. The results are reported in Table I.

EXAMPLE 11

30 g of the (dry) copolymer obtained according to example 4, were fed into a reactor provided with stirrer, thermometer and reflux condenser. At the same time, 44.85 g of sodium hydroxide (48%) and 110 g of deionized water were fed. The reactor was fluxed with nitrogen and heated to boiling for 2 hours under vigorous stirring. A gradual dissolution of the copolymer was obtained and completed within the fixed time (2 h), while an intense yellow coloration was registered. The solution was then cooled, partially decolored, using 2% b.w. of hydrogen peroxide (33% b.w.) and discharged. This solution contained about 17.6% b.w. of hydrolized copolymer (containing maleic acid and vinyl alcohol units) and 7.1% b.w. of sodium acetate. The separation of sodium acetate occurred to be almost impossible by the generally used techniques. Furthermore, the final solution was disagreably smelling, because of partial degradation. The resulting colored solution, when analyzed by GPC, showed a Mw=46,750 and a Mn=12,000; these values correspond to a polydispersity ratio equal to 3.8. Data and results are reported in Table I.

EXAMPLE 12

A powder detergent, not containing sodium tripolyphosphate and having the following b.w. composition:

| | |
|---|---|
| Alkylbenzenesulfonic acid sodium salt (LAS) | 7.0% |
| $C_{13}$-$C_{15}$ alcohols, ethoxylated with 7 mols of EO | 5.0% |
| Soap | 2.0% |
| Zeolite 4A | 27.0% |
| Sodium carbonate | 10.0% |
| Carboxymethylcellulose (as such) | 1.0% |
| Proteolytic enzyme | 0.4% |
| Copolymer (as from Example 10) | 4.0% |
| Sodium sulfate | 18.0% |
| Sodium perborate (tetrahydrate) | 20.0% |
| Sodium disilicate | 3.0% |
| Water | 2.6% | was used for a washing test in a washing machine at 60° C. and 90° C., measuring the washing effect and the incrustations on the fabric after 5,10 and 15 consecutive washings, respectively.

The whiteness index obtained with the above reported formulation was similar to the one obtained with a detergent containing no copolymer at all, 10% b.w. of sodium tripolyphosphate and 22% b.w. of Zeolite 4A, namely better than the whiteness index of a formulation free from TPF and copolymer. The ashes (ash amount), after 15 repeated washings (0.75% b.w.), were of the same order as the ones of the formulations containing 10% b.w. of TPF and no copolymer. The amount of ashes after 15 repeated washings, using the formulation not containing TPF nor copolymer, was higher (more than 1% b.w.).

EXAMPLE 13 (Boiler scale test)

The anti-scaling (anti-fouling) effect of the copolymers according to examples 6, 7, 8, 9 and 10 was verified in a laboratory experimental apparatus, by turbidimetric determinations, taking into account shape and size of the crystals. The inhibition of precipitation and the deposition of solids in non-fouling form was compared with a water which did not contain the transesterified copolymer (a similar test is described also in U.S. Pat. No. 2,723,956).

| EXAMPLE | TRANSESTERIFICATION DEGREE (%) | CA BINDING CAPACITY | DISPERSING CAPACITY | THRESHOLD INHIBITION | COMPLEXING CAPACITY | MOLECULAR WEIGHT (Mw) | (Mn) | R (**) |
|---|---|---|---|---|---|---|---|---|
| 1 (*) | — | GOOD | FAIR | NO | HIGH | — | — | — |
| 6 | 40 | GOOD | GOOD | YES | MEDIUM | 38100 | 11950 | 3.20 |
| 2 (*) | — | GOOD | FAIR | NO | HIGH | — | — | — |
| 7 | 42 | GOOD | GOOD | YES | MEDIUM | 11000 | 3800 | 2.90 |
| 3 (*) | — | GOOD | FAIR | NO | HIGH | — | — | — |
| 8 | 27 | GOOD | GOOD | YES | MEDIUM | 45600 | 13900 | 3.28 |
| 4 (*) | — | GOOD | FAIR | NO | HIGH | — | — | — |
| 9 | 34 | GOOD | GOOD | YES | MEDIUM | 57850 | 14000 | 4.13 |
| 11 (*) | — | GOOD | FAIR | NO | MEDIUM-HIGH | 46750 | 12000 | 3.80 |
| 5 (*) | — | GOOD | FAIR | NO· | HIGH | — | — | — |
| 10 | 37 | GOOD | GOOD | YES | MEDIUM | 34750 | 11000 | 3.16 |

(*) COMPARATIVE
(**) R = POLYDISPERSITY RATIO

What is claimed is:

1. Transesterified copolymers of maleic anhydride, particularly useful in the field of detergency and as anti-scaling agents, comprising those copolymers obtained from preformed copolymers of maleic anhydride with vinyl acetate, and optionally also with other unsaturated comonomers, by an at least partial transesterification of said preformed copolymers.

2. Transesterified copolymers according to claim 1, wherein the transesterification degree is from 10 to 80%.

3. Transesterified copolymers according to claim 1, wherein the copolymers have a weight average molecular weight (Mw) from 1,000 to 100,000 the polydispersity ratio being from 2 to 5.

4. Transesterified copolymers according to claim 1, wherein the copolymers are obtained by transesterification with an aliphatic or cycloaliphatic alcohol.

5. Transesterified copolymers according to claim 4, wherein said alcohol is methanol.

6. Transesterified copolymers according to claim 1 characterized by the fact that the starting preformed copolymers are obtained by pre-mixing, in the liquid phase, the two basic comonomers, maleic anhydride and vinyl acetate, with formation of an equimolar adduct, and by subsequent polymerization of said adduct, optionally in the presence of a radical initiator, thus obtaining a preformed copolymer showing an alternate structure.

7. Transesterified copolymers according to claim 1, wherein the copolymers are obtained from preformed copolymers containing, besides maleic anhydride and vinyl acetate, in equimolar ratio, also a mono-unsaturated termonomer.

8. Transesterified copolymers according to claim 7, wherein the starting preformed copolymers (or terpolymers) are in turn obtained by the following subsequent operations:

(a) premixing, in the liquid phase, of the two basic comonomers, maleic anhydride and vinyl acetate, under formation of an equimolar adduct;

(b) copolymerization of said adduct, optionally in the presence of a radical initiator, with said mono-unsaturated termonmer, under formation of a preformed terpolymer, containing both said adduct and said termonomer according to a random distribution.

9. Transesterified copolymers according to claim 7, wherein the amount of termonomer is between 0.05 and 1 mole per mole of maleic anhydride.

10. Transesterified copolymers according to claim 2, wherein the transesterification degree is from 15 to 50%.

11. Transesterified copolymers according to claim 3, wherein the average molecular weight is from 2,000 to 50,000.

12. Transesterified copolymers according to claim 4, wherein the aliphatic or cycloaliphatic alcohol is selected from saturated aliphatic alcohols containing from 1 to 4 C atoms.

13. Transesterified copolymers according to claim 7, wherein the termonomer is selected from acrylic acid, methacrylic acid, methyl acrylate, butyl acrylate, ethyl acrylate, hydroxyethyl acrylate, itaconic acid, methylvinyl ether and vinyl acetate, in effective amounts.

14. Transesterified copolymers of maleic anhydride, particularly useful in the field of detergency and an anti-scaling agents, comprising those copolymers obtained from preformed copolymers of maleic anhydride with vinyl acetate, having alternate and regular comonomer structure, by an at least partial transesterification of said preformed copolymers.

* * * * *